(12) United States Patent
Kulkarni et al.

(10) Patent No.: US 10,766,618 B2
(45) Date of Patent: Sep. 8, 2020

(54) DRONES CONVERTIBLE INTO PERSONAL COMPUTERS

(71) Applicant: Intel Corporation, Santa Clara, CA (US)

(72) Inventors: Shantanu D. Kulkarni, Hillsboro, OR (US); Gavin Sung, New Taipei (TW); Jeff Ku, Taipei (TW)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 15/855,516

(22) Filed: Dec. 27, 2017

(65) Prior Publication Data
US 2019/0047697 A1    Feb. 14, 2019

(51) Int. Cl.
| | |
|---|---|
| B64D 33/02 | (2006.01) |
| B64C 39/02 | (2006.01) |
| B64C 11/46 | (2006.01) |
| B64C 25/10 | (2006.01) |
| B64D 47/08 | (2006.01) |
| G06F 1/20 | (2006.01) |
| G06F 1/16 | (2006.01) |
| G06F 1/324 | (2019.01) |

(52) U.S. Cl.
CPC .......... *B64C 39/024* (2013.01); *B64C 11/46* (2013.01); *B64C 25/10* (2013.01); *B64D 47/08* (2013.01); *G06F 1/166* (2013.01); *G06F 1/1632* (2013.01); *G06F 1/1656* (2013.01); *G06F 1/1677* (2013.01); *G06F 1/206* (2013.01); *G06F 1/324* (2013.01); *B64C 2201/027* (2013.01); *B64C 2201/108* (2013.01); *B64C 2201/12* (2013.01)

(58) Field of Classification Search
CPC ..... B64C 39/024; B64C 27/022; B64C 27/08; B64C 2201/00; B64C 2201/126; B64C 2201/108; B64C 2201/027; B64C 2201/12; B64C 2201/20; B64C 2201/201; B64C 11/46; B64C 25/10; B64C 47/08; G06F 1/1632; G06F 1/1656; G06F 1/166; G06F 1/1677; G06F 1/206; G06F 1/324
USPC .......................................................... 244/17
See application file for complete search history.

(56) References Cited

U.S. PATENT DOCUMENTS

| | | | |
|---|---|---|---|
| 6,859,886 B1* | 2/2005 | Johnson | G06F 1/3203 327/540 |
| 9,738,380 B2* | 8/2017 | Claridge | B64C 19/00 |
| 2013/0235520 A1* | 9/2013 | Huang | G06F 1/1632 361/679.48 |
| 2016/0194069 A1* | 7/2016 | Taylor | B64C 39/024 244/17.23 |
| 2018/0229837 A1* | 8/2018 | Kimchi | B64C 27/52 |

\* cited by examiner

*Primary Examiner* — Assres H Woldemaryam
(74) *Attorney, Agent, or Firm* — Hanley, Flight & Zimmerman, LLC

(57) ABSTRACT

Drones convertible into personal computers are disclosed. A disclosed unmanned aerial vehicle (UAV) includes a body and rotors carried by the body. The rotors move relative to the body from a first position when the UAV is in a drone mode to a second position when the UAV is in a computer mode.

22 Claims, 14 Drawing Sheets

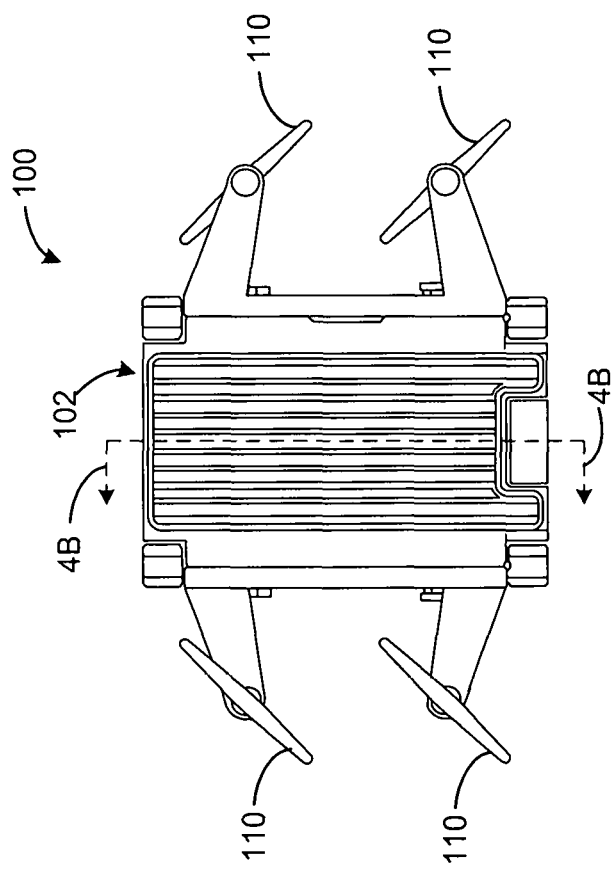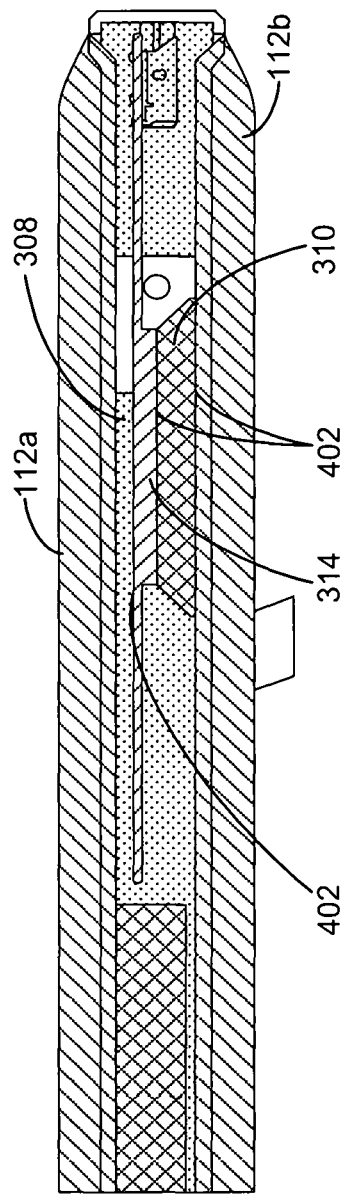
FIG. 4A
FIG. 4B

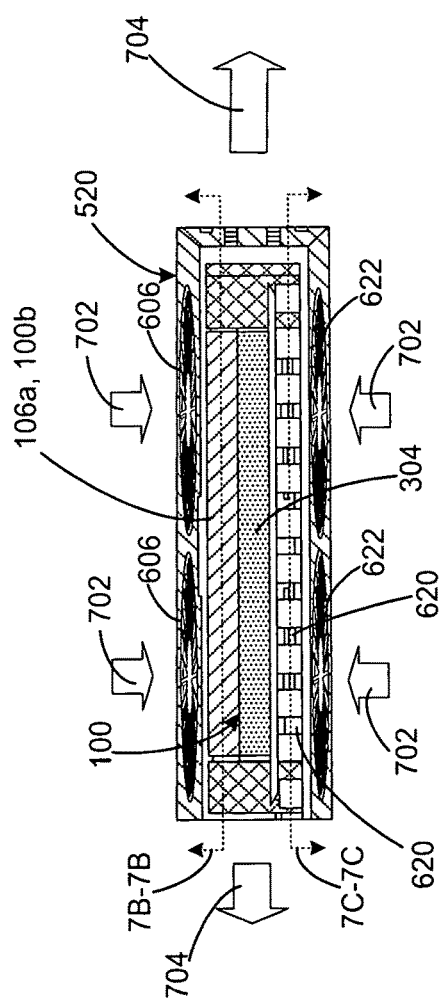
FIG. 7A
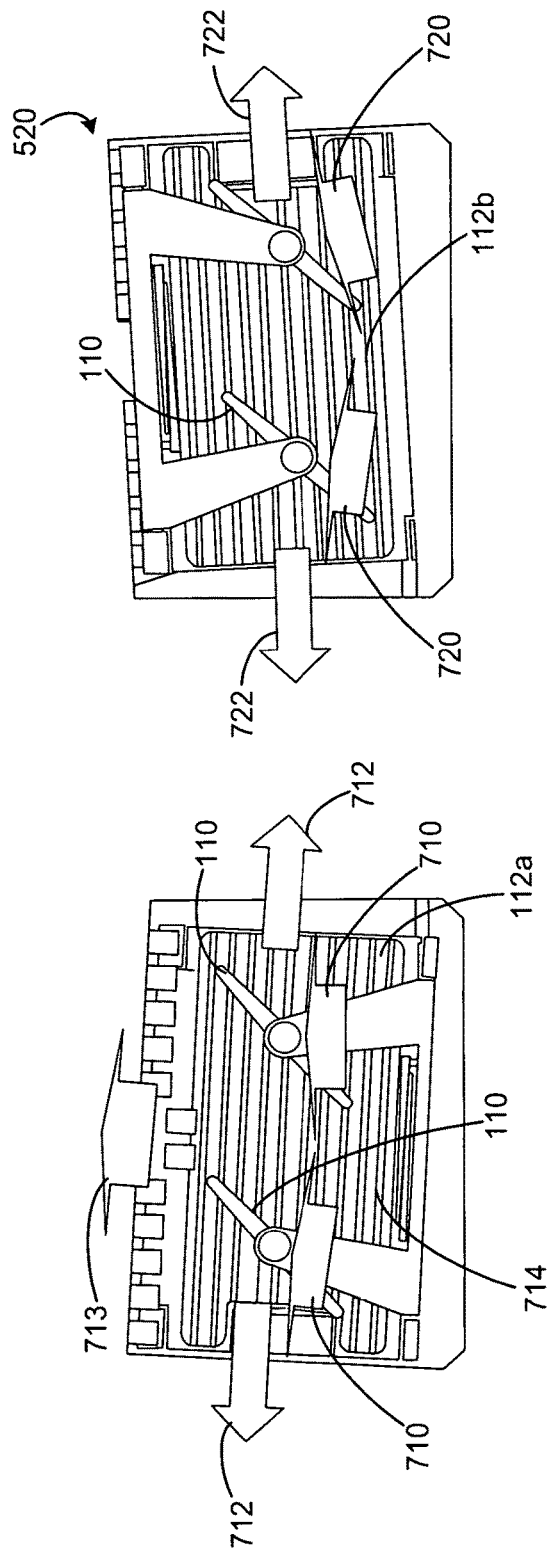
FIG. 7B
FIG. 7C

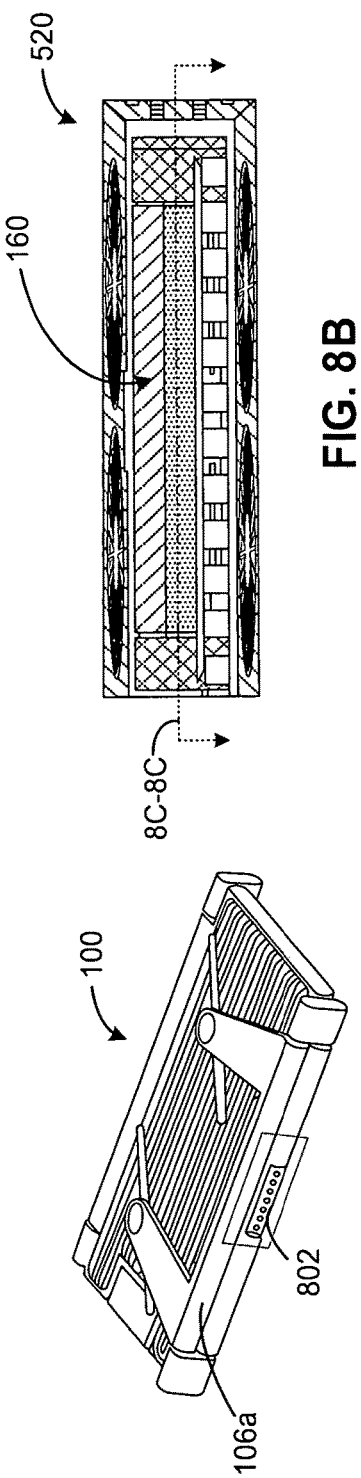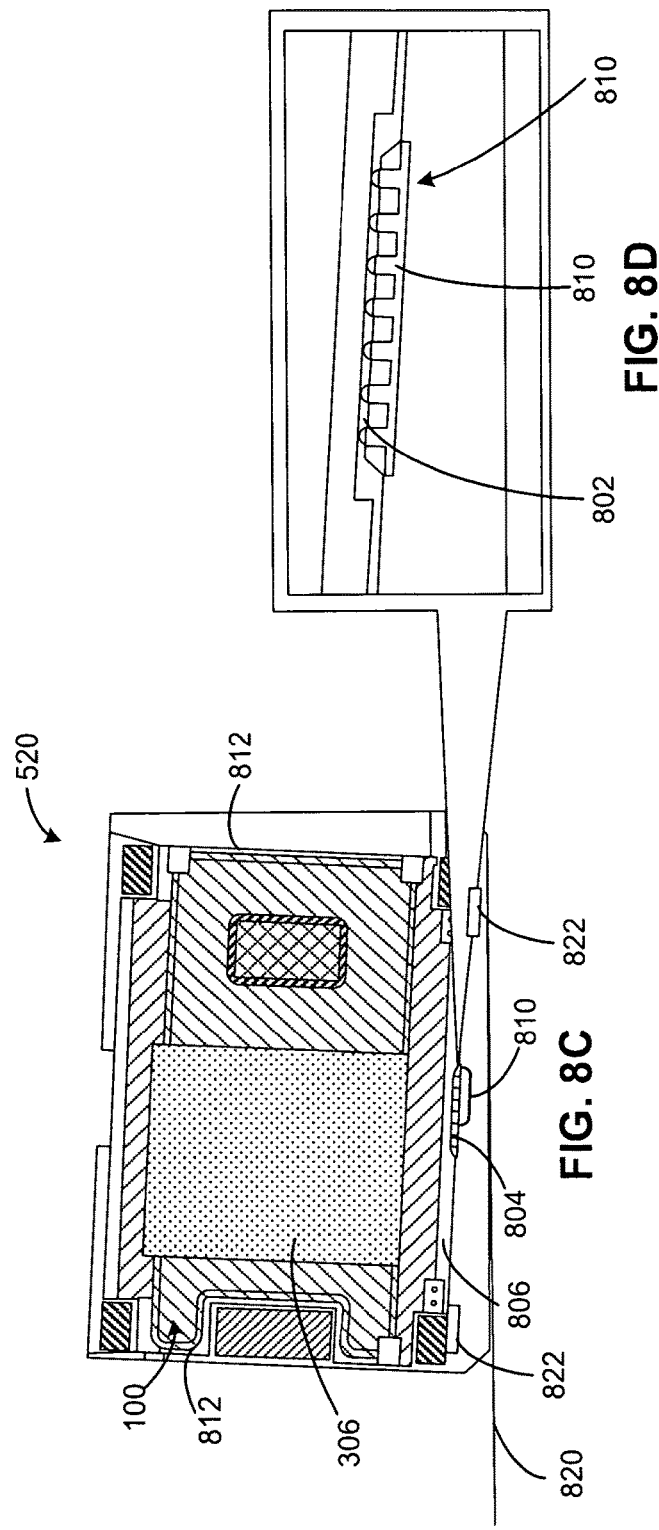

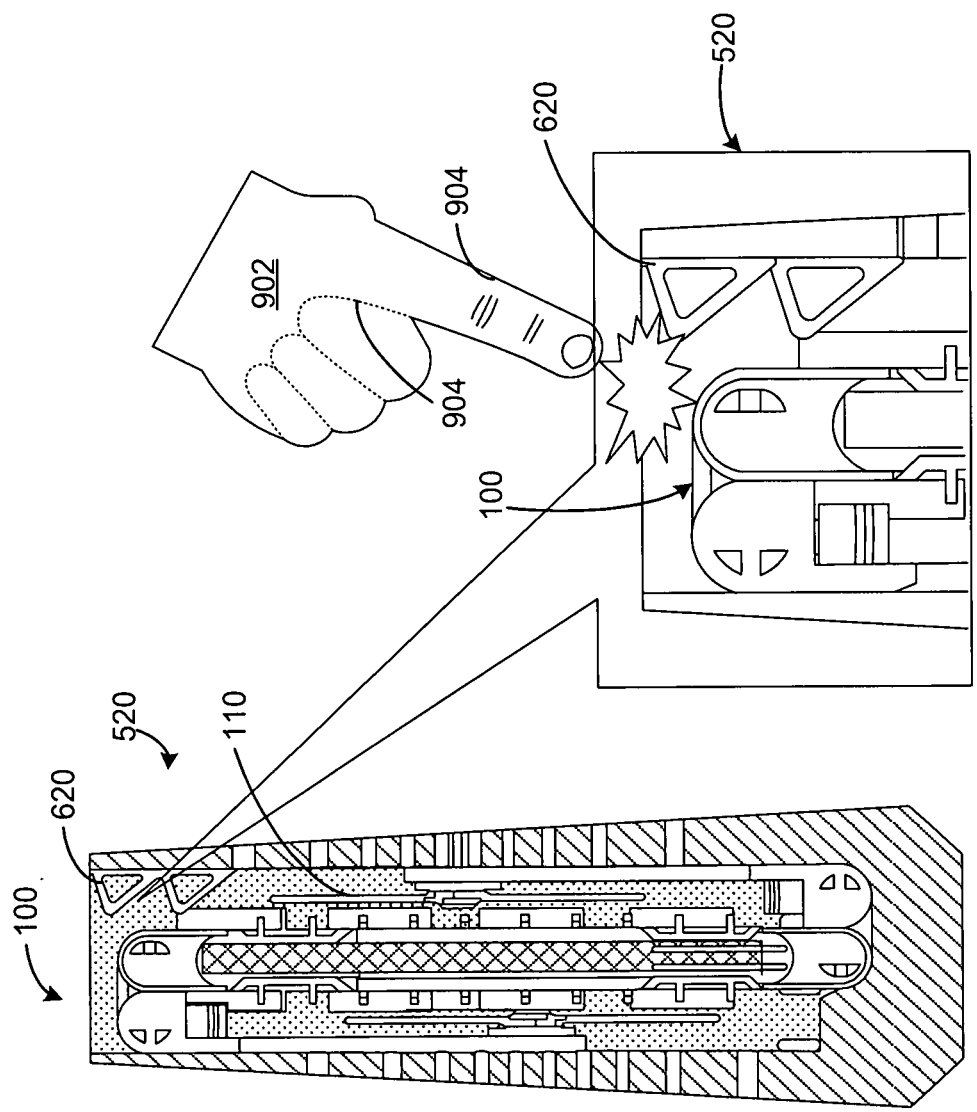

DRONES CONVERTIBLE INTO PERSONAL COMPUTERS

FIELD OF THE DISCLOSURE

This disclosure relates generally to unmanned aircraft and, more particularly, to drones that are convertible into personal computers.

BACKGROUND

Unmanned aerial vehicles (UAVs), sometimes referred to as drones, are becoming more readily available. Indeed, the market for UAVs is rapidly growing. UAVs are now being used in a wide variety of industries, such as farming, shipping, forestry management, surveillance, disaster scenarios, gaming, photography, marketing, etc. As both navigational capabilities and power efficiency for UAVs have increased, some UAVs can travel very significant distances to perform tasks (e.g., take measurements, record photographs or video, etc.).

BRIEF DESCRIPTION OF THE DRAWINGS

FIG. 4A is a top view of the example UAV of FIGS. 1-3.

FIG. 4B is a cross-sectional view of the example UAV taken along the line 4B-4B of FIG. 4A.

FIGS. 7A-7C depict example airflows that may be generated for cooling examples disclosed herein.

FIGS. 8A-8D depict an example connector that may be implemented in examples disclosed herein.

FIGS. 9A-9B depict example rotor guards that may be implemented in examples disclosed herein.

Figure 1:
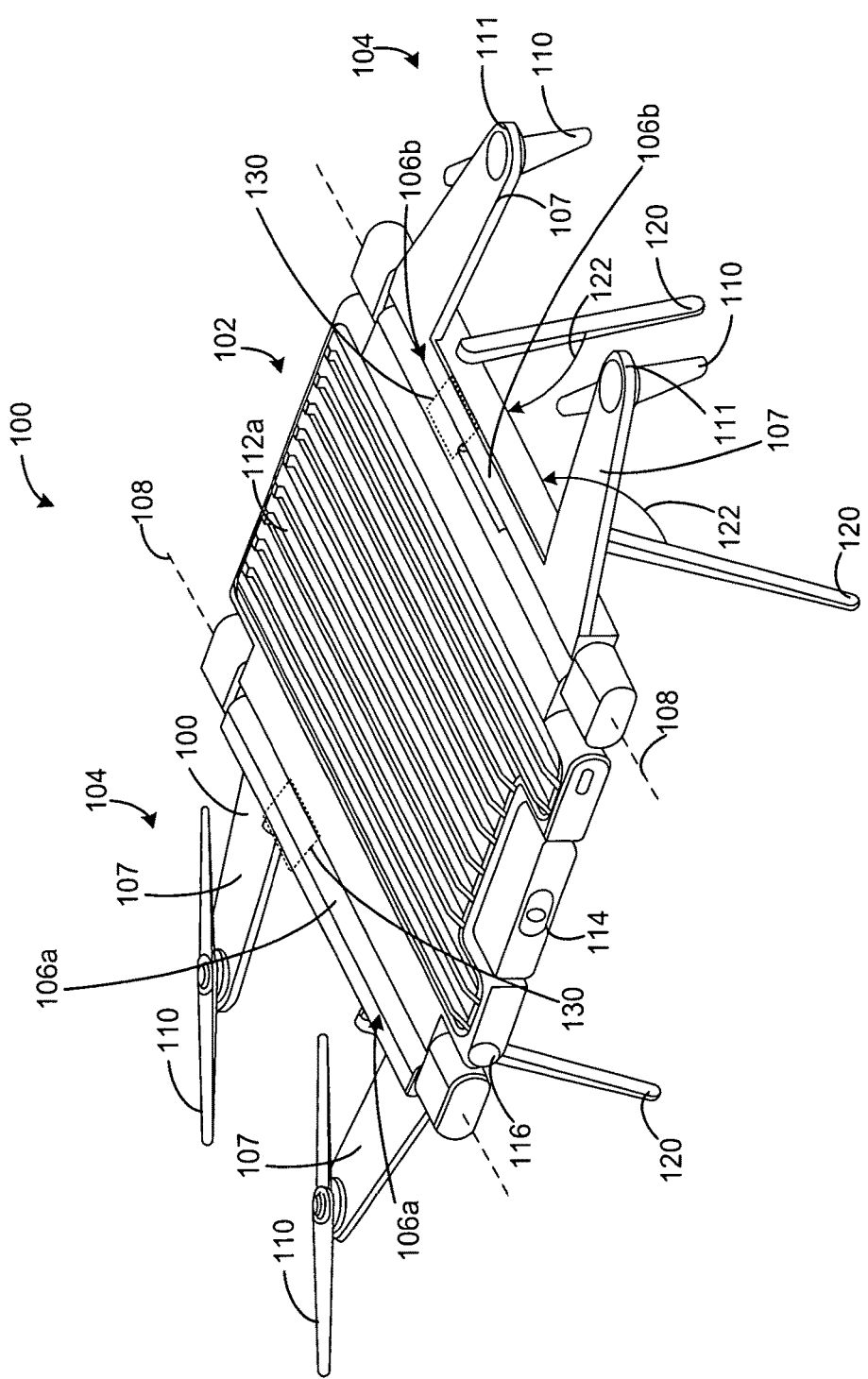
FIG. 1 illustrates an example convertible unmanned aerial vehicle (UAV) configured as a vehicle in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Drones (e.g., UAVs) that are convertible into computers are disclosed. Unmanned aerial vehicles (UAVs), which are also referred to as drones have an increased variety of applications. As both navigational capabilities and power efficiency for UAVs have increased, some UAVs can travel very significant distances to perform tasks (e.g., take measurements, record photographs or video, etc.). Further, data taken or recorded by a UAV are typically offloaded from the UAV to an external computer for further analysis due to computational and/or battery limitations of the UAV.

Examples disclosed herein enable UAVs to be used as computers (e.g., personal computers, computer terminals, workstations, etc.). Examples disclosed herein enable a UAV to undergo a physical transformation from a drone mode to a computer mode. In the drone mode, the UAV is capable of moving itself from one geographic location go another (e.g., via rotors itself or the like). In the computer mode, the UAV does not move itself from one physical location to another. Instead, its means of locomotion (e.g., its rotors) may be disabled and/or repositioned for another use, such as cooling. For example, in the computer mode, the UAV can analyze data obtained by the UAV during flight. In some examples, the UAV can be deployed as a self-transporting computer (e.g., deployed via its own means for locomotion to a remotely located user and/or site to provide computing capabilities). Some examples disclosed herein implement movable (e.g., rotatable and/or translatable) arms or mounts having rotor blades coupled thereto. In some examples, the movable arms/mounts are disposed on opposite sides of the UAV and may be folded towards a body and/or a heatsink of the UAV when the UAV is converted from the drone mode to the computer mode. As a result, a processor disposed in the body is cooled by airflow generated by the rotor blades (e.g., by the blades blowing air towards the heatsink) when the UAV is operated in the computer mode. Some example UAVs disclosed herein are placed into a receiving dock in the computer mode of the UAV so that the UAV can be easily communicatively coupled to input/output (I/O) devices and/or an external network, and to prevent contact with and/or injury from the rotors while operating as cooling fans.

In some examples, the UAV includes a scalable processor that can operate at relatively lower clock speeds for flight navigation and/or camera control when in the drone mode, and can also operate at relatively higher clock speeds when in the computer mode. In some examples, the rotor blades are generally aligned at a same vertical height when the rotor blades are positioned for flight operation in the drone mode. In some examples, the UAV includes movable (e.g., rotatable) landing legs in addition to the rotatable arms/mounts. In some examples, the dock provides power (e.g., supplemental power, primary power, etc.) to the UAV when the UAV is docked thereto to provide additional power for running the processor at higher clock speeds in the computer mode. Operating at a lower clock speed in the drone mode reduces power usage and heat generation. In some examples, the UAV includes a camera mounted to the body of the UAV. In some examples, the camera is mounted via a gimbal.

FIG. 1 illustrates an example unmanned aerial vehicle (UAV) 100 constructed in accordance with teachings of this disclosure and shown in a drone mode. The UAV 100 of the illustrated example includes a body (e.g., frame body, a body structure, etc.) 102. Rotor assemblies 104 are coupled to opposite sides of the body 102. In this example, both of the rotor assemblies 104 include a movable support (e.g., a mounting plate, a contoured mounting plate) 106a, 106b. The movable supports 106a, 106b have arms/mounts 107 projecting therefrom. The arms/mounts 107 support rotors (e.g., rotor blades, etc.) 110a, 110b at their respective distal ends 111. In the illustrated example, each rotor assembly 104 includes one arm support 106a, 106b, and each support 106a, 106b includes two arms/mounts 107. Therefore, each support 106a, 106b includes two rotors 110. Other numbers of these components may be provided in other examples.

The supports 106a, 106b are rotatably mounted to the body 102 to rotate about respective axes 108. Thus, the arms 107 and the rotors 110 pivot as their respective support 106a, 106b is rotated. In the illustrated example, the supports 106a, 106b pivot in opposite directions. The supports 106a, 106b may be mounted to the body 102 using any described type of mechanical fastener such as hinges.

In the illustrated example, the body 102 includes two heatsink arrays 112a, 112b. One of the heatsink arrays 112a is mounted to a top of the body 102. The other of the heatsink arrays 112b is mounted to the bottom of the body 102 (See FIGS. 2 and 3). The example body 102 also includes a camera assembly 114. In this example, the camera assembly 114 includes a gimbal to stabilize images and/or video taken by the camera assembly 114. A power switch or button 116 is carried by the body 102 for turning the UAV 100 on and off.

In the illustrated example, the UAV 100 includes landing legs 120. In this example, the landing legs 120 are movably (e.g., pivotably) coupled to the body 102 and/or the supports 106a, 106b for rotation in directions generally indicated by double arrows 122. The legs 120 may be mounted to the body 102 and/or the mount for rotation using any type of mechanical fastener (e.g., a bushing and bolt). In other examples, the legs 120 are mounted to respective ones of the arms 107. In such examples, the landing legs 120 rotate outward from the body 102 when the supports 106 are pivoted. In some examples, the legs 120 are integral with the corresponding rotatable supports 106 and do not pivot relative to the arms 107.

In some examples, the UAV 100 includes one or more actuators 130 to move the supports 106a, 106b, the arms 107 and/or the landing legs 120 between various positions. The actuators 130 may be implemented as a motor(s), solenoid(s) and/or any other appropriate actuation device. The inclusion of the actuator(s) 130 enables automated and/or powered conversion between the drone and computer modes.

The UAV 100 of the illustrated example includes a self-guidance system. Additionally or alternatively, the UAV 100 can be manually guided or controlled via a wireless (e.g., RF) signal connection. In the illustrated example, the UAV 100 can maneuver based on controlled rotation of the rotors 110. In particular, varying rotational speeds of the rotors 110 enables controlled movement (e.g., flight maneuvers, navigation, etc.) of the UAV 100. In some examples, the camera assembly 114 is used to capture images or video while the UAV 100 is in flight. As will be discussed in greater detail below, the UAV 100 can be converted from the drone mode of FIG. 1 when the UAV 100 is capable of self-propelled flight into a computer mode where the UAV 100 does not move itself, but instead operates as a non-self-propelled computer (e.g., a personal computer, a workstation, a user terminal, a computational node, etc.). In the computer mode, the rotors 110 are not used for movement of the UAV 100, but instead are used to cool a processor 314 (shown in FIG. 3) of the UAV 100. The processor 314 may operate at a higher clock speed in the computer mode than in the drone mode.

Figure 2:
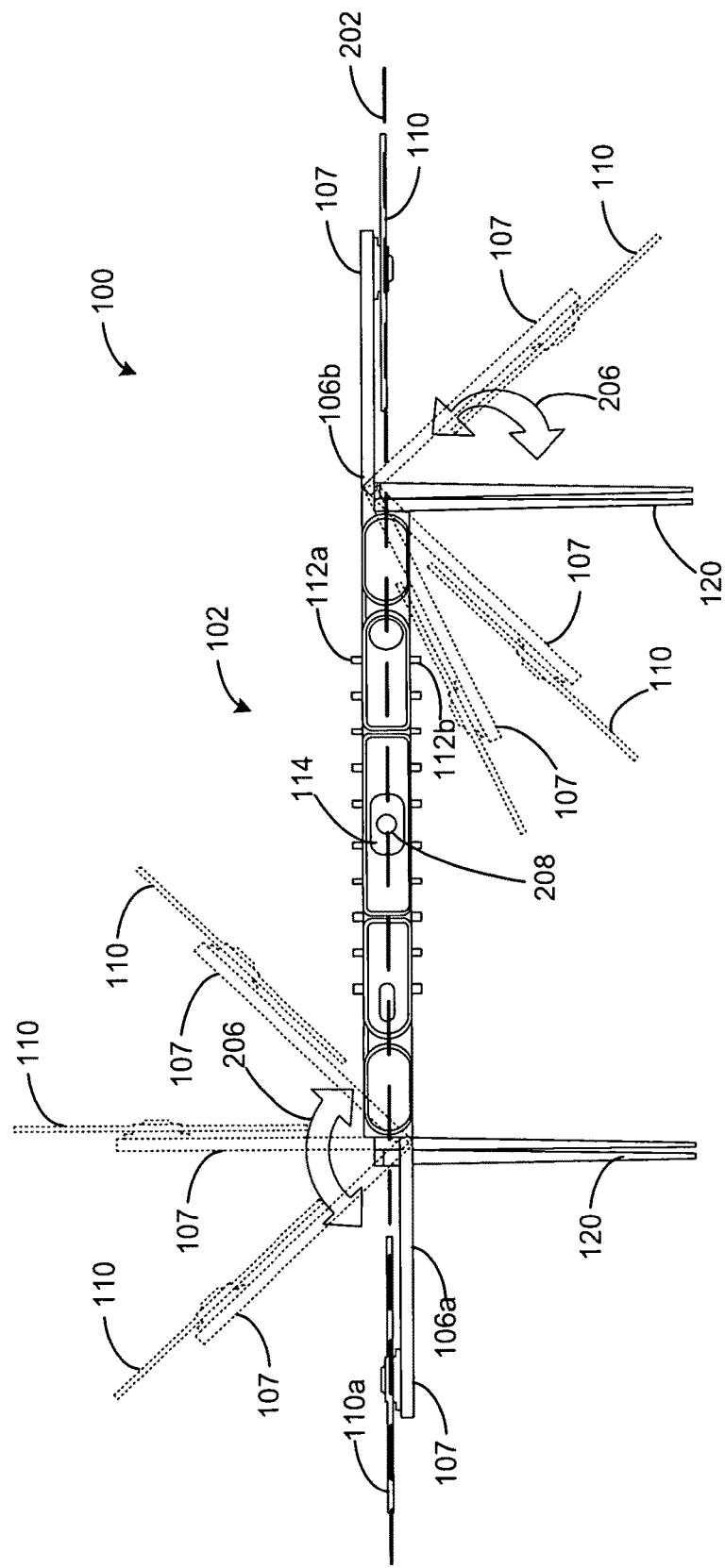
FIG. 2 is a front view of the example UAV of FIG. 1.

FIG. 2 is a front view of the example UAV 100 of FIG. 1. In the illustrated view of FIG. 2, a reference line 202 is shown to illustrate that the rotors 110a, 110b are generally aligned at a same height (along a horizontal plane in the view of FIG. 2) when the UAV 100 is in a level position relative to a reference like Earth. The rotatable supports 106a, 106b (and/or the arms 107 of the supports 106a, 106b) rotate along opposite directions to deploy or un-deploy, as indicated by double arrows 206. In other words, the supports 106a, 106b of the illustrated example rotate toward different sides of the body 102 (i.e., the support 106a is rotated toward the upper side of the body 102 and the support 106b is rotated toward the lower side of the body 102 in the view of FIG. 2). The rotors 110 are generally aligned with the reference line 202 in the same horizontal plane when deployed in the drone mode. In some examples, a camera lens 208 of the camera assembly 114 is also generally aligned with the reference line 202. Additionally or alternatively, the heatsink arrays 112a, 112b are positioned on opposite sides of the body 102 (e.g., on the upper and lower sides of the body 102). at approximately equal vertical distances on opposite sides the reference line 202.

Figure 3:
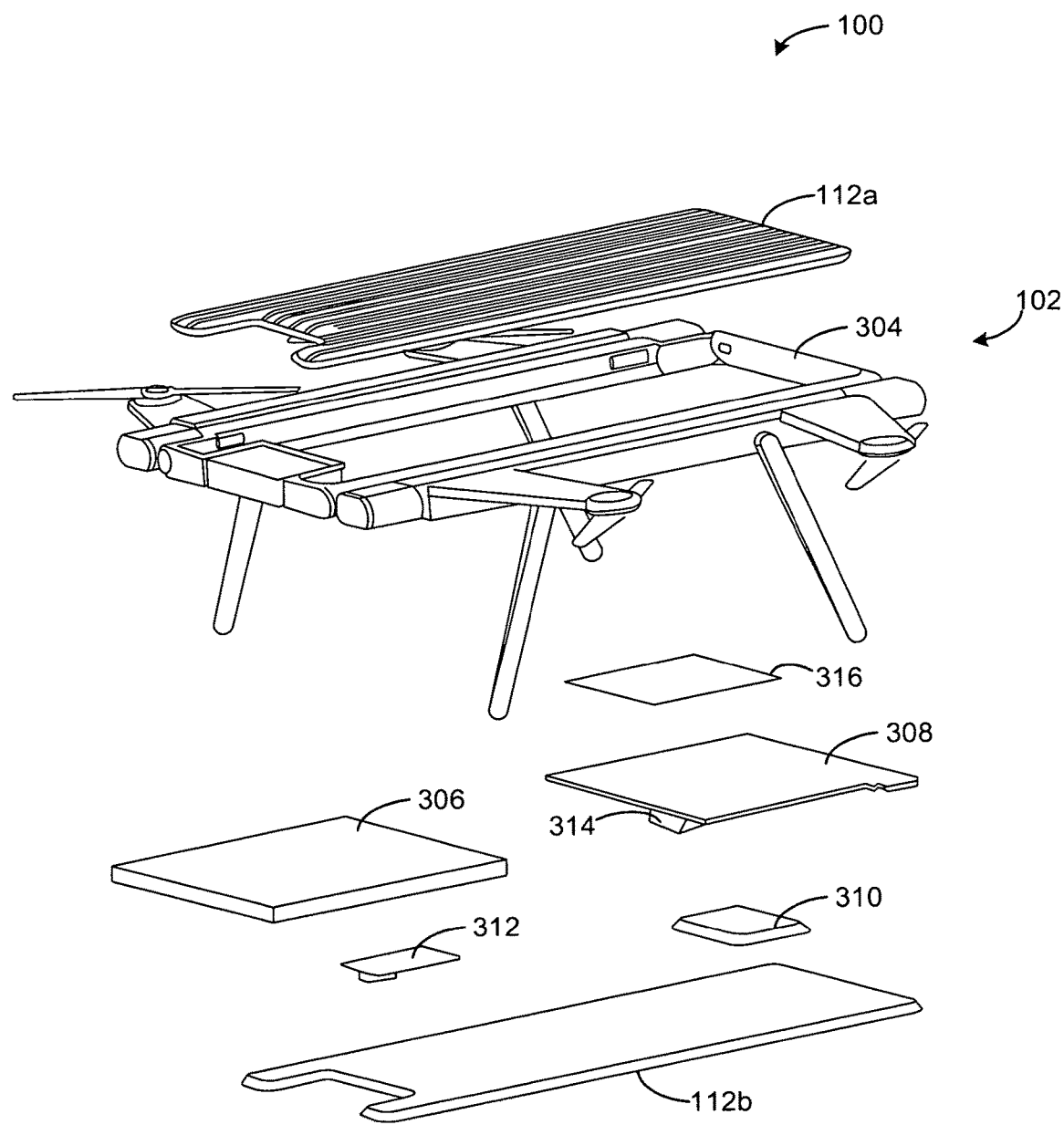
FIG. 3 is an exploded view of the example UAV of FIGS. 1 and 2.

FIG. 3 is an exploded view of the example UAV 100 of FIGS. 1 and 2. In particular, numerous components of the body 102 are shown separated from one another for clarity. According to the illustrated example of FIG. 3, the body 102 includes a frame (e.g., an airframe structure, a chassis, etc.) 304. The body 102 carries the upper heatsink array 112a, a battery (e.g., a battery assembly, a battery module) 306, a printed circuit board (PCB) (e.g., a motherboard, etc.) 308 with numerous electrical components and/or circuits such as those shown in FIG. 12, a thermal bracket 310, a camera board 312 of the camera assembly 114 (shown in FIGS. 1 and 2) and the lower heatsink array 112b. In some examples, the PCB 308 carries and/or implements a mode converter 316.

In the illustrated example, the PCB 308 carries the aforementioned processor 314. The processor 314 may be implemented as a die, a system-on-chip (SOC), a multicore processor, etc. In the illustrated example, the processor 314 is a hardware (e.g., a semiconductor board) processor. The processor 314 can be run at a lower clock speed when the UAV 100 is in the drone mode. Conversely, the processor 314 can run at a relatively higher clock speed when the UAV 100 is operated in the computer mode (e.g., higher clock speeds will facilitate computational tasks such as running user applications, data processing, video and/or graphical processing, etc.).

While the example UAV 100 includes both upper and lower heatsink arrays 112a, 112b, a single heatsink array may be implemented in some examples. While the UAV 100 utilizes the same processor 314 for both flight and computer functionality, the UAV 100 may include two or more processors. For example, the UAV 100 may utilize a flight processor in the drone mode, and a different processor in the computer mode. These two different processors may operate at different clock speeds. In some examples, the thermal bracket 310 is at least partially composed of copper. However, any appropriate material may be used.

FIG. 4A is a top view of the example UAV 100 of FIGS. 1-3. In the example of FIG. 4A, the UAV 100 is shown in the drone mode with the rotors 110 deployed outward from the body 102 for flight.

FIG. 4B is a cross-sectional view taken along the line 4B-4B of FIG. 4A. In this example, the upper and lower heatsink arrays 112a, 112b are shown. The PCB 308, the processor 314 and the thermal bracket 310 are shown disposed between the heatsink arrays 112a, 112b.

To facilitate heat conduction from the processor 314 and/or the PCB 308 to one or more of the heatsink arrays 112a, 112b, the processor 314 is thermally coupled to the thermal bracket 310. The thermal bracket 310 is, in turn, coupled to the lower heatsink array 112b in this example. Additionally or alternatively, an upper side (in the view of FIG. 4B) of the PCB 308 may be thermally coupled to the upper heatsink array 112a (e.g., via a second thermal bracket). In other examples, the processor 314 is directly thermally coupled to the lower heatsink array 112b (e.g., the thermal bracket 310 is omitted). In this example, thermal gaskets and/or thermal paste 402 are used to facilitate contact between the PCB 308, the heatsink arrays 112a, 112b, the processor 314 and the thermal bracket 310, thereby enabling relatively high thermal conduction therebetween.

Figure 5A:
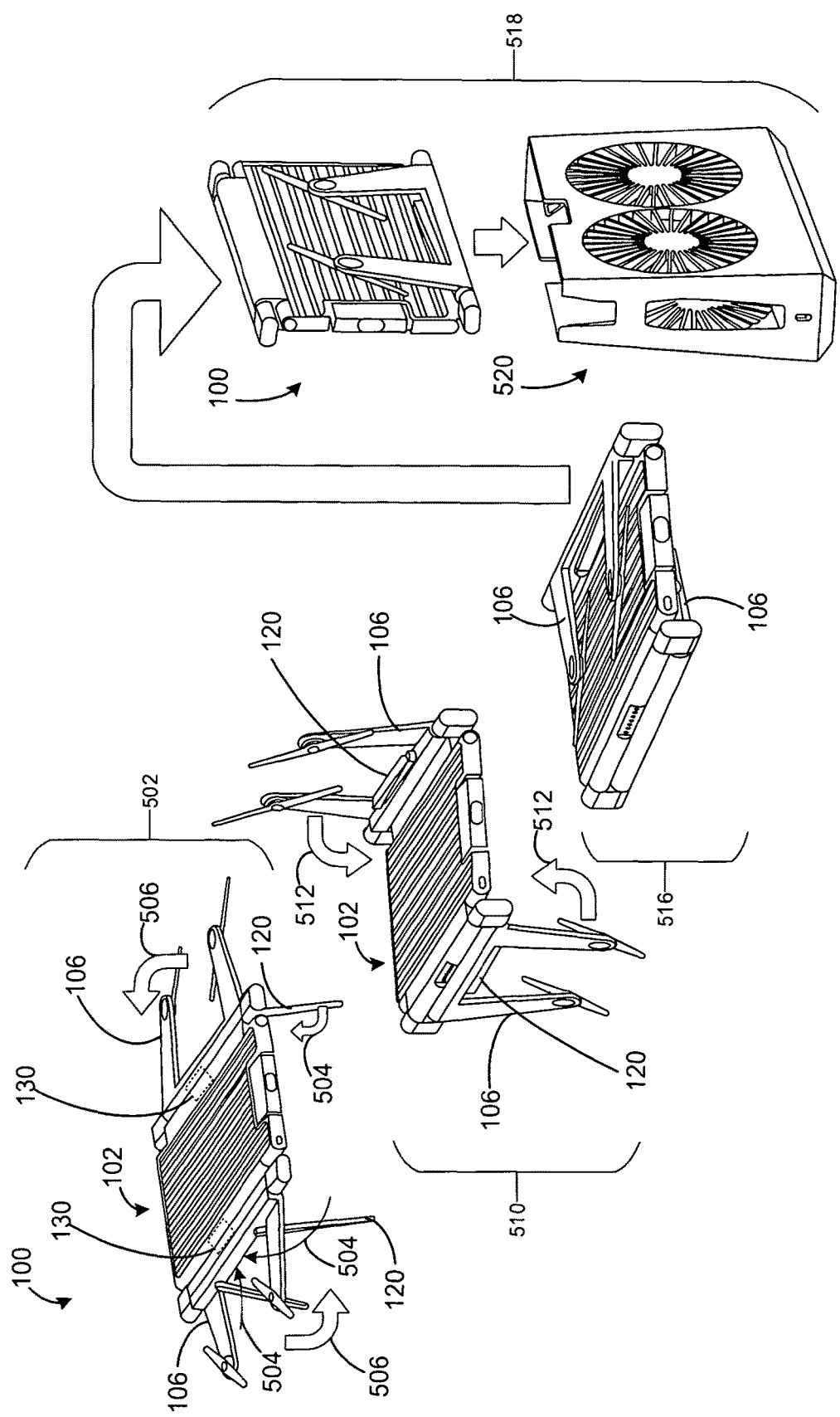
FIG. 5A depicts example stages of the example UAV of FIGS. 1-4 as it converts from a drone mode into a computer mode.

FIG. 5A depicts the example UAV 100 of FIGS. 1-4 converting from the drone mode into the computer mode. In a first position 502, the UAV 100 is in the drone mode. To begin the conversion, the landing legs 120 are folded upwards towards the body 102, as generally indicated by arrows 504. In the first position 502, the supports 106a, 106b are in their respective vehicle operation positions (e.g., deployed flight positions), but ready to be rotated towards the body 102, as generally indicated by arrows 506. In this example, the rotatable supports 106a, 106b are rotated in opposite directions (e.g., the same rotational direction). Locks of any type may be used to hold the supports 106a, 106b and/or the landing legs 120 in the deployed position and/or the stored position. In other examples, one or both of the supports 106a, 106b are rotated in the opposite direction from those shown in FIG. 5A. In some examples, at least one of the supports 106a, 106b and/or the landing legs 120 are rotated by the actuators 130. In such examples, the UAV 100 is at least partially self-folding.

FIG. 5A also depicts an intermediate position 510 in which the rotatable supports 106a, 106b are being folded towards the body 102, as generally indicated by arrows 512. A third example position 516 depicts the UAV 100 with the supports 106a, 106b fully folded towards the body 102 and, thus, the UAV 100 in the computer mode. Subsequently the fully folded UAV 100 is inserted into a dock 520 (e.g., a cavity of the dock 520) to facilitate operation in the computer mode and protect against injury that can result from inadvertent contact with the rotors 110. The UAV 100 in the dock 520 may be thought of as the final computing position 518. In the example positions 516 and 518, the supports 106 are rotated to respective computer operation positions so that the UAV 100 can be inserted into the dock 520. In particular, the example supports 106 are rotated to position the rotors 110 in close proximity to (e.g., adjacent to) the respective heatsink arrays 112a, 112b.

Figure 5B:
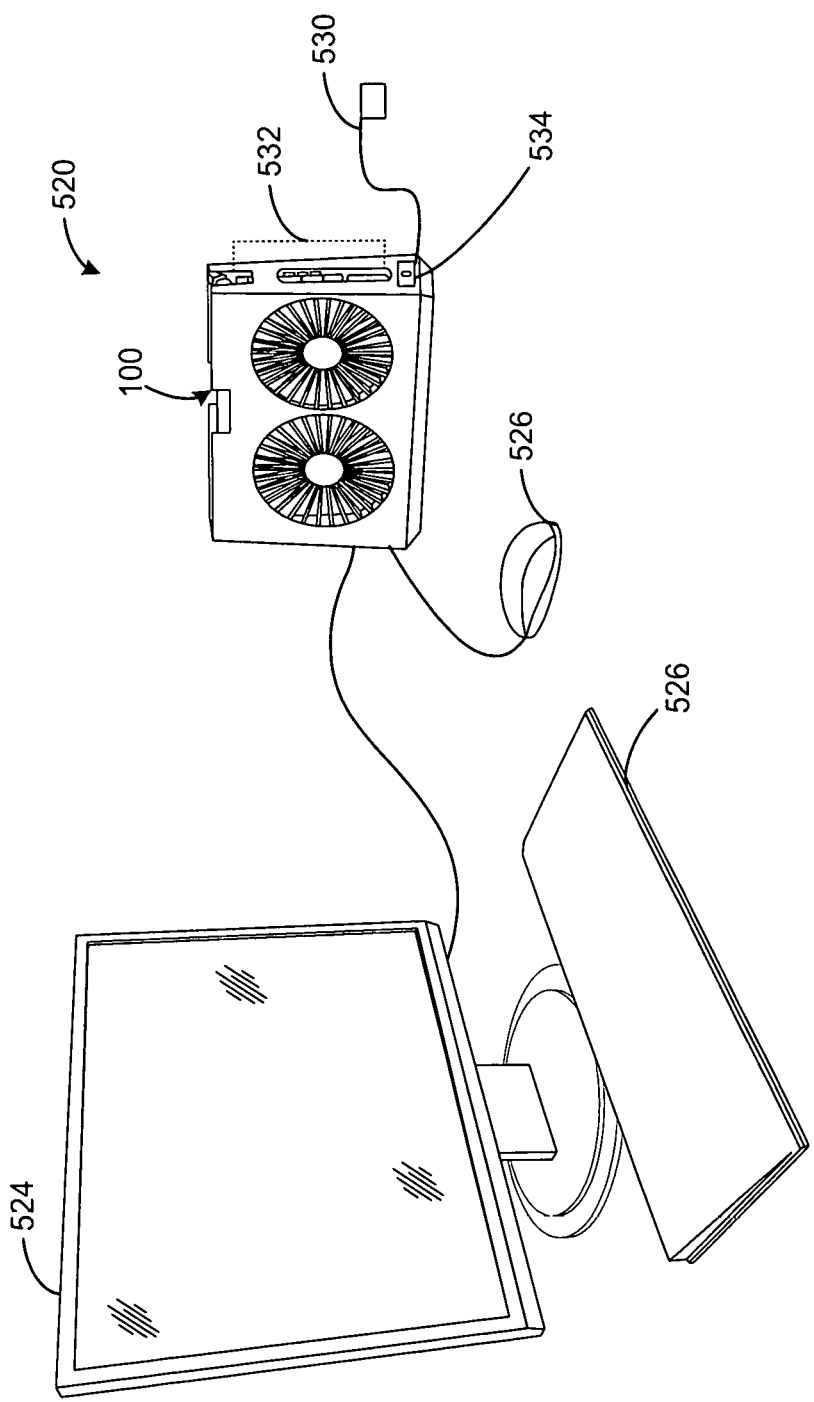
FIG. 5B depicts the example UAV configured as a personal computer in accordance with teachings of this disclosure.

FIG. 5B depicts the example UAV 100 in communication with an external monitor 524 and a mouse for operating as a personal computer. In some examples, the dock 520 may be in wired or wireless communication with the display or monitor 524 and/or in wired or wireless communication with one or more input devices 526 (e.g., a keyboard and/or mouse). The example dock 520 is also coupled to an external power supply/cable 530.

In some examples, at least one of the input devices 526 and/or the display 524 are integral with the dock 520. In some other examples, a battery 532 is used to power the dock 520 and/or supplement operation of the UAV 100 when operating in the computer mode. In other examples, the display 524 is integral with the UAV 100.

In some examples, the UAV 100 forms part of a distributed computing system (e.g., a server, a distributed computation system, a network node or gateway, a calculation array, etc.) when in the computer mode. In some other examples, the UAV 100 is not inserted into a dock and is, instead, operated as a computer without the benefit of the dock 520 after the UAV 100 has landed at a destination.

The dock 520 is useful in some examples to facilitate connection to other devices. As such, the dock 520 includes a connector that communicates with an interface of the UAV 100. In other examples, the dock 520 is omitted. In some such examples, I/O devices 526 may be directly coupled to the UAV 100. In some examples, the UAV 100 includes a projector (e.g., a video projector) 534 so that the display 524 is not needed.

Figure 6B:
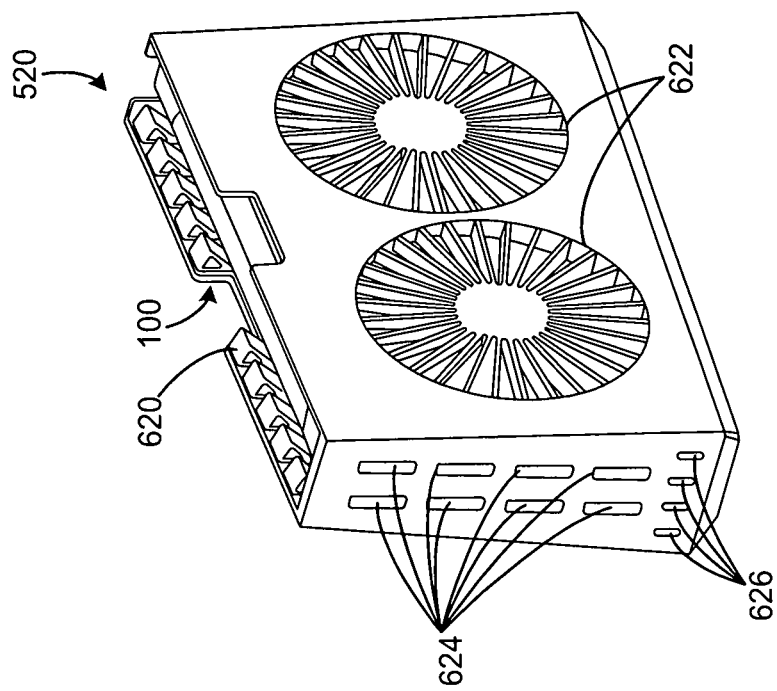
FIGS. 6A and 6B are front side and rear side views, respectively, depicting the example UAV positioned in an example dock.
Figure 6A:
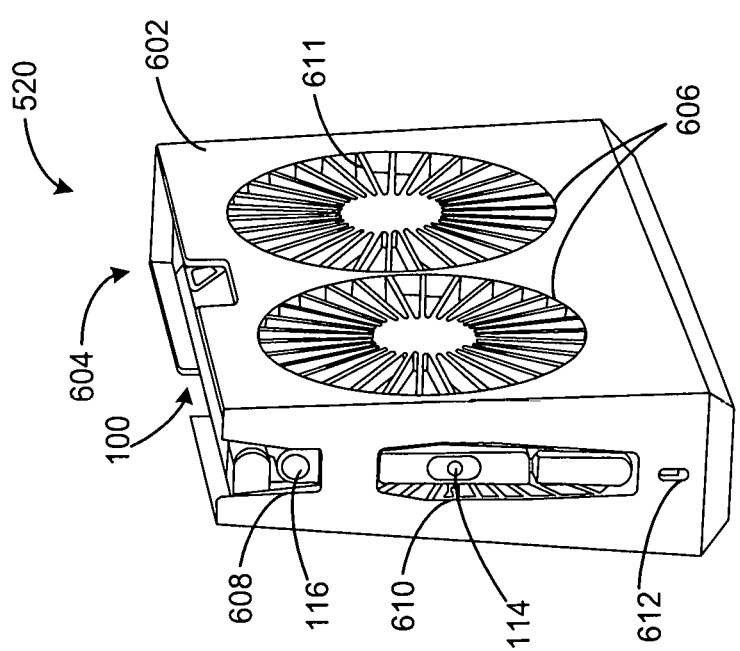

FIGS. 6A and 6B are front, right side perspective and rear, left side, perspective views, respectively, of an example implementation of the dock 520. Turning to FIG. 6A, the dock 520 of the illustrated example includes a housing 602 having an opening or slot (e.g., a top opening) 604 to receive the UAV 100. Further, the dock 520 includes vents 606, an opening 608 to access the power switch 116 and an opening 610 for the camera assembly 114. In this example, the vents 606 are generally circular-shaped radial patterns having support webs 611. In some examples, the dock 520 also includes an I/O port 612, which may be implemented as a universal serial bus (USB) connector. In some examples, the camera assembly 114 is operated when the UAV 100 is docked in the dock 520 and also when the UAV 100 is operated in the drone mode.

Turning to FIG. 6B, the dock 520 is shown with stops (e.g., finger stops) 620. The stops 620 may be rubber or plastic. In this example, the dock 520 also includes openings or vents 622 on an opposite side from the vents 606 described above in connection with FIG. 6A. In this example, the vents 622 are generally identical to the vents 606 in terms of overall structures and geometry. In the illustrated example, the dock 520 also includes outlet openings (e.g., exhaust openings) 624. The dock 520 also includes I/O ports 626 (e.g., USB ports). While the I/O ports 626 of the illustrated example are universal serial bus connectors, any appropriate I/O ports and/or data protocol(s) may be used.

FIGS. 7A-7C depict example airflows that may be generated for cooling the UAV 100 and/or its electronics in examples disclosed herein. Turning to FIG. 7A, a cross-sectional view is shown depicting the UAV 100 disposed within the dock 520. The rotatable support 106a, the frame 304 and the stops 620 are shown in FIG. 7A. In this example, arrows 702 indicate inlet air drawn into the dock 520 by the rotors 110 into the openings 606, 622 while arrows 704 indicate exhaust air exiting the dock 520.

Turning to FIG. 7B, a cross-sectional view taken along line 7B-7B of FIG. 7A is shown. In this example, arrows 710 generally indicate air drawn into the view of FIG. 7B by the rotors 110. The air flows towards the heatsink array 112a. Further, arrows 712, 713 indicate heated air exiting away from the heatsink array 112a. Fins 714 of the heatsink array 112a generally extend in the directions of the arrows 712, thereby facilitating relatively efficient heat removal from the heatsink array 112a. The orientation (e.g., generally horizontal) of the fins 714 facilitates outward movement of the air in the directions indicated by the arrows 712. The fins 714 increase surface area for heat transfer associated with the heatsink array 112a.

FIG. 7C is a cross-sectional view taken along line 7C-7C of FIG. 7A. Similar to FIG. 7B, FIG. 7C depicts arrows 720 indicating air drawn toward the heatsink array 112b by the rotors 110 (into the view of FIG. 7C) while arrows 722 depict heated air being exhausted from the dock 520 and the heatsink array 112b.

FIGS. 8A-8D depict an example interface that may be implemented in examples disclosed herein to couple the UAV 100 to the dock 520. FIG. 8A is a perspective view of the folded UAV 100 in the computer mode. In the illustrated example, the UAV 100 includes an interface 802 proximate the rotatable support 106a. The interface 802 of this example includes multiple electrical pins and may be implemented as a pogo pin pad connector, for example.

FIG. 8B is a cross-sectional view of the dock 520 with the UAV 100 disposed within. FIG. 8B is shown from above (e.g., along a direction of insertion of the UAV 100 into the dock 520).

FIG. 8C is a cross-sectional view taken along line 8C-8C of FIG. 8B. As can be seen in the illustrated view of FIG. 8C, a lower wall (e.g., an alignment wall) 804 of the dock 520 and a bottom edge 806 of the UAV 100 are in contact. In this example, the dock 520 includes a connector 810 structured to mate with the interface 802 of the UAV 100 shown in connection with FIG. 8A.

To facilitate engagement of the connector 810 to the interface 802 to thereby secure the UAV 100 in position relative to the dock 520, the UAV 100 is inserted into the dock 520 until the bottom edge 806 contacts the lower wall 804. In particular, as the folded UAV 100 is inserted into the dock 520, the inner walls 812 and/or structural guides of the dock 520 guide the movement of the UAV 100 so that the connector 810 is aligned to the interface 802 during insertion of the UAV 100. In this example, the connector 810 is implemented as a pogo pin connector. Accordingly, the interface 802 and the connector 810 define a pogo pin interface (e.g., a pogo pin pad array). However, any other appropriate connection or insertion scheme may additionally or alternatively be implemented.

In some examples, the dock 520 includes supports 822a, 822b to determine a presence of the UAV 100 within the dock 520. The supports 822a, 822b may be implemented as sensors (e.g., magnetic sensors, optic sensors, proximity sensors, actuated switches, etc.).

FIG. 8D is a detailed view of the connector 810 in engagement with the interface 802 when the folded UAV 100 is placed into the dock 520. In this example, the orientation of the dock 520 relative to a support surface 820 (shown in FIG. 8C) facilitates compression of the pogo pins of the connector 810 against the interface 802 based on gravity. In particular, the weight of the UAV 100 compresses the pogo pins against the interface 802.

FIGS. 9A and 9B depict example stops 620 that may be implemented in examples disclosed herein. FIG. 9A is a cross-sectional view of the UAV 100 inserted in the dock 520. The illustrated view of FIG. 9A depicts an example placement of the stops 620 relative to the UAV 100 and the rotors 110.

FIG. 9B is a detailed view of a portion of FIG. 9A illustrating how the stops 620 may prevent access (e.g., human access) to the rotor blades 110 by a hand 902 and/or fingers 904 when the UAV is operating in the computer mode while positioned in the dock 520. In some examples, the stops 620 are additionally or alternatively used to contact and/or retain the UAV 100 from being unintentionally removed from the dock 520. In such examples, the stops 620 may be implemented as retention or snap tabs.

The stops 620 have a generally hollow triangular profile in the view of FIG. 9B. However, any other appropriate geometry may be used.

Figure 10:
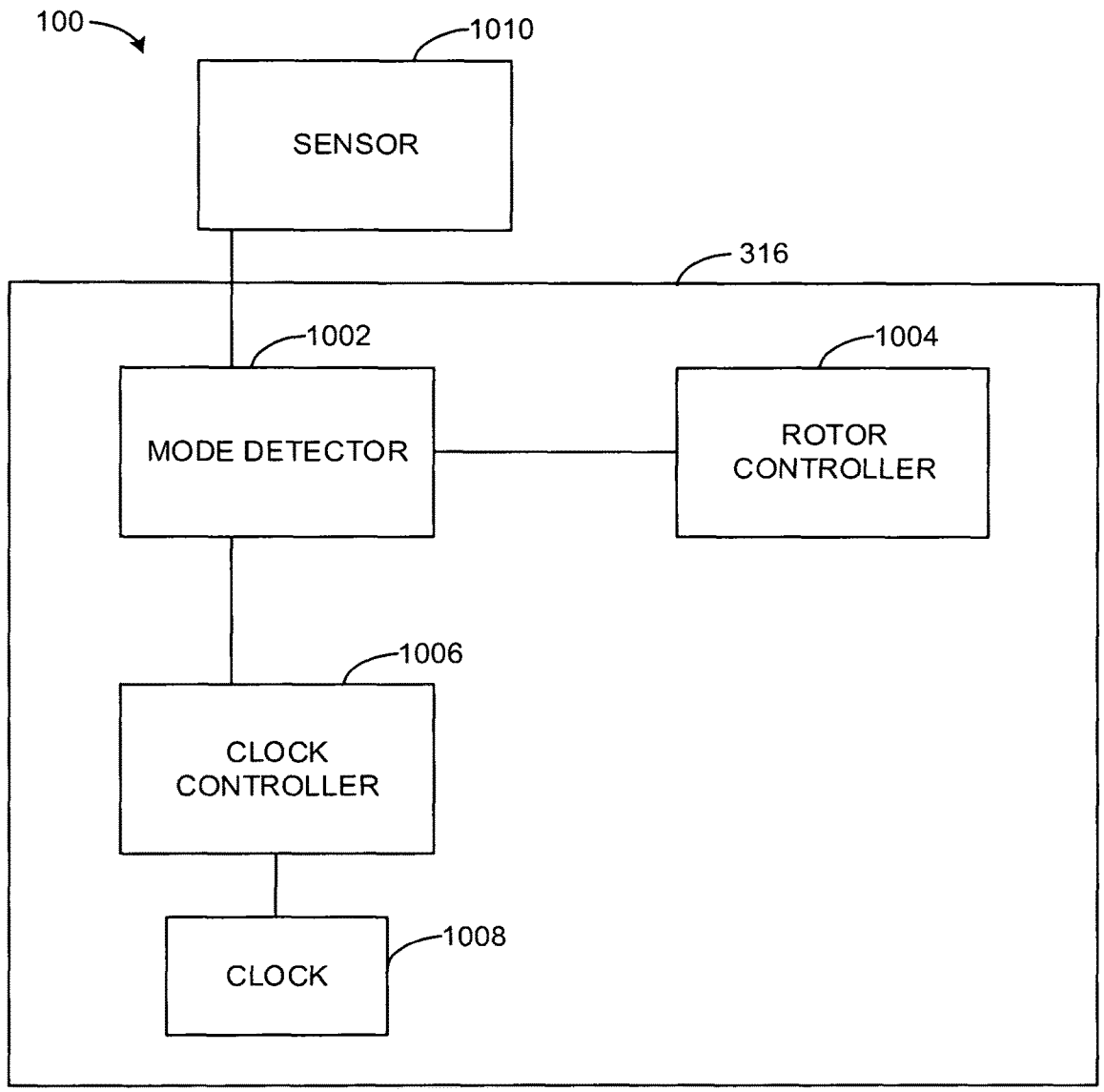
FIG. 10 is a schematic overview of an example mode converter of the example UAV.

FIG. 10 is a schematic overview of an example mode converter 316 of the UAV 100. The example mode converter 316 includes a mode detector 1002, a rotor controller 1004, and a clock controller 1006. The example mode detector 1002 is communicatively coupled to a sensor 1010.

In the illustrated example, the mode detector 1002 determines whether the UAV 100 is in the computer mode or the drone mode. In some examples, the mode detector 1002 utilizes measurements from the sensor 1010 to make the mode determination. For example, the sensor 1010 may be a temperature sensor, a switch, a magnet detector, a rotor position sensor, etc. to detect a presence of the UAV 100 in the dock 520. In some examples, the mode is determined by a position (e.g., angular position) of the supports 106a, 106b and/or the rotors 110 relative to the body 102. In other examples, the mode detector 1002 may detect current from the dock 520 and/or the portion(s) of one or more of the supports 822a, 822b to make the mode determination.

To control a speed and/or an on/off state of the rotors 110, the rotor controller 1004 is communicatively coupled to one or more motors that drive the rotors 110. In this example, the mode detector 1002 directs the rotor controller 1004 to spin (e.g., to turn on for either for propulsion or to cool the processor 314) based on the mode (e.g., drone mode or computer mode) of the UAV 100 identified by the mode detector 1002.

The clock controller 1006 of the illustrated example controls a clock speed of the processor 314. In particular, the example clock controller 1006 directs the processor 314 to operate at a higher clock speed when the UAV 100 is operated in the computer mode. Conversely, the clock controller 1006 directs the processor 314 to operate at a lower clock speed when the UAV 100 is operated in the drone mode (e.g., to conserve power). The processor 314 includes an onboard clock 1008, but the processor 314 is able to operate at a fraction of the clock speed as needed.

In some examples, the rotor controller 1004 is directed by the mode detector 1002 to control rotational speeds of the rotors 110. Additionally or alternatively, the rotor controller 1004 may utilize a temperature measured by the sensor 1010 (e.g., by the temperature of the processor 314) to control the on/off state and/or the rotational speeds of the rotors 110 when in the computer mode.

While an example manner of implementing the mode converter 316 of FIG. 3 is illustrated in FIG. 10, one or more of the elements, processes and/or devices illustrated in FIG. 10 may be combined, divided, re-arranged, omitted, eliminated and/or implemented in any other way. Further, the example mode detector 1002, the example rotor controller 1004, the example clock controller 1006 and/or, more generally, the example mode converter 316 of FIG. 3 may be implemented by hardware, software, firmware and/or any combination of hardware, software and/or firmware. Thus, for example, any of the example mode detector 1002, the example rotor controller 1004, the example clock controller 1006 and/or, more generally, the example mode converter 316 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, mode detector 1002, the example rotor controller 1004, and/or the example clock controller 1006 is/are hereby expressly defined to include a non-transitory computer readable storage device or storage disk such as a memory, a digital versatile disk (DVD), a compact disk (CD), a Blu-ray disk, etc. including the software and/or firmware. Further still, the example mode converter 316 of FIG. 3 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
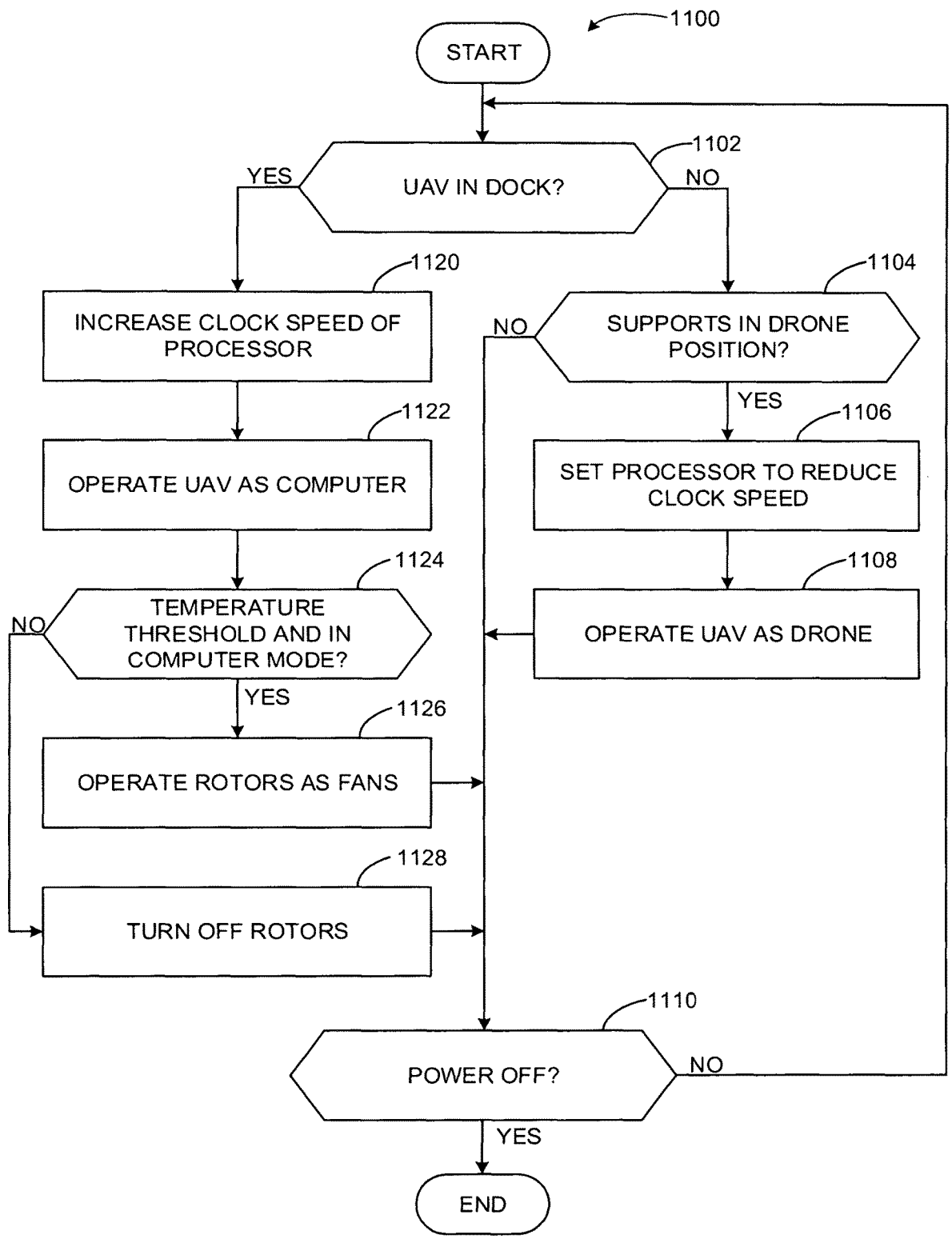
FIG. 11 is a flowchart representative of example machine readable instructions which may be executed to implement the mode converter of FIG. 10.

A flowchart representative of example hardware logic or machine readable instructions for implementing the mode converter 316 of FIG. 3 is shown in FIG. 11. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example mode converter 316 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example instructions 1100 of FIG. 11 begin at block 1102 as the example mode detector 1002 determines whether the UAV 100 is in the dock 520 (block 1102). If the UAV 100 is inserted/coupled to the dock 520 (block 1102), control of the process proceeds to block 1120. Otherwise, the process proceeds to block 1104.

When the mode detector 1002 determines that the UAV 100 is in the dock 520, the example mode detector 1002 determines whether the supports 106*a*, 106*b* are in a drone position (e.g., instead of a computer position corresponding the computer mode) based on measurements/data from the sensor 1010 (block 1104). If the supports 106*a*, 106*b* are determined to be in the drone position (block 1104), control of the process proceeds to block 1106. Otherwise, control of the process proceeds to block 1110.

When the supports 106*a*, 106*b* are in the drone position, the clock controller 1006 sets the clock 1008 of the processor 314 to a reduced/lowered clock speed (e.g., from a first clock speed to a second clock speed lower than the first clock speed) (block 1106). In some examples, the clock speed is predefined. In some examples, the clock speed is not varied by the clock controller 1006 if the clock speed is already set to the predefined clock speed.

After reducing the clock speed of the clock 1008, the UAV 100 operates as a drone, for example (block 1108). The UAV 100 may be manually controlled or self-navigating (e.g., based on a guidance system of the UAV 100 and/or external guidance systems).

The example mode detector 1002 then determines whether the UAV 100 is in a power off condition (block 1110). If the UAV 100 is in not in a power off condition (block 1110), control of the process returns to block 1102 to again check the state of the UAV 100. Otherwise, the process ends.

Returning to block 1102 when the UAV 100 is in the dock 520, the clock controller 1006 increases the clock speed of the clock 1008 to a predetermined speed (e.g., from a first clock speed to a second clock speed greater than the first clock speed) (block 1120). In this example, the mode detector 1002 directs the clock controller 1006 to increase the clock speed and/or directs a degree to which the clock speed is to be increased. In other examples, the increased clock speed is not predetermined and is instead adjusted based on conditions measured by the sensor 1010.

When the UAV 100 is operated in the computer mode (block 1122). The UAV 100 may be operated as personal computer or as a node in a distributed computational system, for example. In some examples, a user can edit, process and/or modify data captured (e.g., photographs, video, audio, etc.) by the UAV 100 during flight.

According to the illustrated example, the mode detector 1002 determines whether a temperature threshold has been met and whether the UAV 100 is in the computer mode (block 1124). If the temperature threshold has been met (e.g., a measured temperature is equal to the temperature threshold, the measured temperature exceeds the temperature threshold, etc.) in the computer mode (block 1124), control proceeds to block 1126. Otherwise, control proceeds to block 1128.

If the temperature threshold has been met in the computer mode (block 1124), the example rotor controller 1004 directs the rotors 110 to spin, thereby cooling the processor 314, components of the PCB 308, etc. (block 1126) and the process proceeds to block 1110.

When the temperature threshold has been not exceeded and/or the UAV 100 is not in the computer mode (block 1124), the example rotor controller 1004 directs the rotors 110 to turn off (e.g., stop) (block 1128) and the process proceeds to block 1110. In other examples, the rotors 110 are operated while in the computer mode without regard to the temperature. In such examples, a degree to which the rotors 110 are spun may vary based on temperatures (e.g., temperatures of the processor 314 and/or the heatsink arrays 112a, 112b) measured by the sensor 1010.

Figure 12:
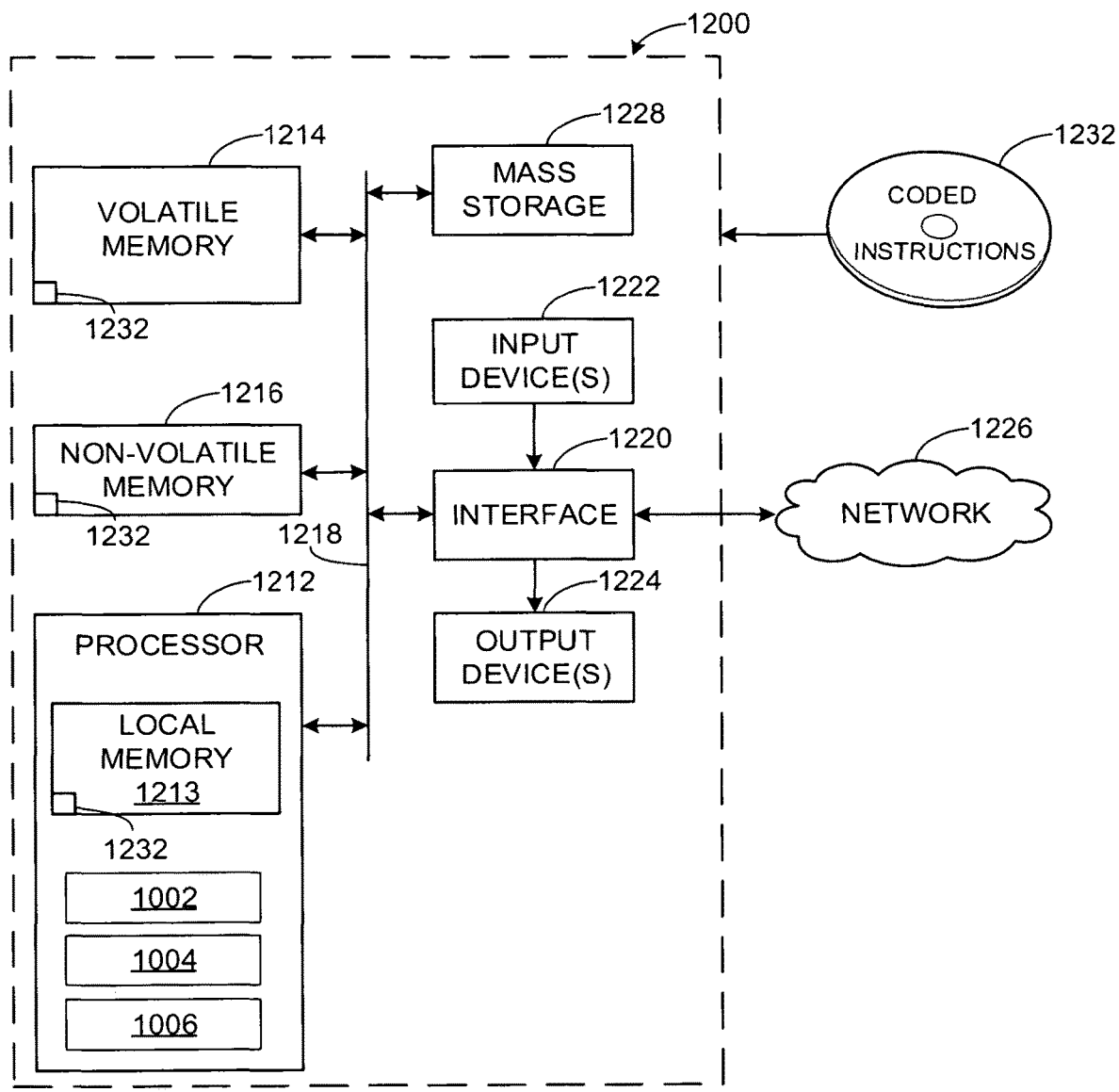
FIG. 12 illustrates a processor platform structured to execute the instructions of FIG. 11 to implement the mode converter of FIG. 10 and/or the UAV of FIGS. 1-9B.

FIG. 12 is a block diagram of an example processor platform 1200 structured to execute the instructions of FIG. 11 to implement the example mode converter 316 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example mode detector 1002, the example rotor controller 1004, and the example clock controller 1006.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 11 may be stored in the mass storage device 1228, in the volatile memory 1214, in the non-volatile memory 1216, and/or on a removable non-transitory computer readable storage medium such as a CD or DVD.

Figure 13:
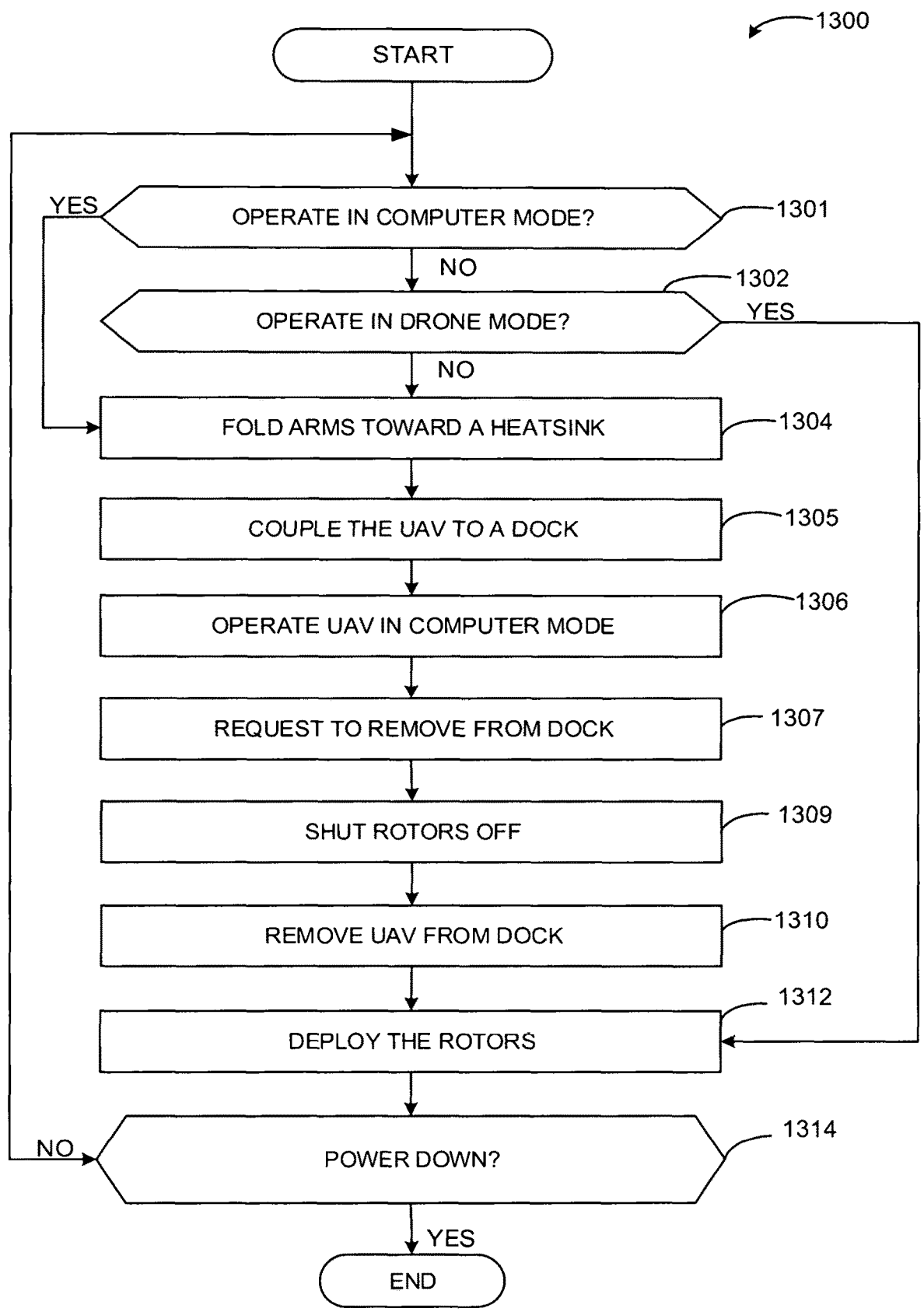
FIG. 13 is a flowchart representative of an example method to implement examples disclosed herein.

FIG. 13 is a flowchart representative of an example method 1300 to implement examples disclosed herein.

In this example, a determination (e.g., a user determination) is made regarding whether the UAV 100 is to be operated in a computer mode (block 1301). If the UAV 100 is to be operated in the computer mode, control of the example method 1300 proceeds to block 1304. Otherwise, the method 1300 proceeds to block 1302.

In the illustrated example, a determination is made regarding whether to operate the UAV 100 in the drone mode (block 1302). This determination may be user made. If the UAV 100 is to be operated in the drone mode (block 1302), the method 1300 proceeds to block 1312. Otherwise, the method 1300 proceeds to block 1304.

When the UAV 100 is to be operated in the computer mode, the example rotatable arms 107 are folded or rotated toward the corresponding heatsink array 112 (block 1304). In particular, the rotatable arms 107 are rotated with the respective rotatable supports 106 to place the rotors 110 proximate and/or facing the corresponding heatsink array 112 so that the heatsink array 112 can be cooled when the UAV 100 is operated in the computer mode. In some examples, the UAV 100 is able to at least partially self-fold at least one the arms 107 (e.g., via the actuator or motor 130, etc.).

The UAV 100 is coupled to the dock 520 (block 1305). In particular, the example UAV 100 is inserted into the dock 520 to communicatively couple the interface 802 of the UAV 100 with the connector 810 of the dock 520. As a result, data communications between the UAV 100 and one or more of the I/O devices 526 is established in this example.

The UAV 100 is operated in the computer mode (block 1306). In this example, a user operates the UAV 100 at a remote location.

In the illustrated example, a request to remove the UAV 100 from the dock 520 is received (e.g., from a user) (block 1307). In particular, the UAV 100 may be physically removed from the dock 520 and/or a button on the dock 520 may be operated to cause the UAV 100 to be released from the dock 520.

The rotors 110 are shut off once the UAV 100 is finished being operated in the computer mode (block 1309). In this example, the rotor controller 1004 prevents voltage from being provided to motors of the rotors 110 when the request to remove the UAV 100 is received (e.g., from a user).

The UAV 100 is removed from the dock 520 (block 1310). In this example, a user removes the UAV 100 from the dock 520.

After the UAV 100 is removed from the dock 520, the rotors 110 of the illustrated example are deployed (block 1312). According to the illustrated example, the supports 106a, 106b are rotated away from the body 102 so that the rotors 110 can be deployed for locomotion of the UAV 100.

It is then determined whether a power down condition has been reached (block 1314). If the power down condition has not been reached (block 1314), the example method 1300 returns to block 1301. Otherwise, the example method 1300 ends.

Example 1 includes an unmanned aerial vehicle (UAV) including a body, and rotors carried by the body, where the rotors are to move relative to the body from a first position when the UAV is in a drone mode to a second position when the UAV is in a computer mode.

Example 2 includes the subject matter of Example 1, and further includes arms having a first end carried by the body and a second end carrying the rotors, where the arms are to move from a first position to a second position, where the rotors are positioned to levitate the body when the arms are in the first position, and where the rotors are positioned to move air toward the body when the arms are in the second position.

Example 3 includes the subject matter of Example 2, and further includes at least one processor carried by the body and a heatsink carried by the body, the heatsink positioned to cool the processor, the rotors to move the air toward the heatsink when the UAV is in the computer mode.

Example 4 includes the subject matter of any one of Examples 2 or 3, where the arms are pivotally coupled to the body.

Example 5 includes the subject matter of Example 4, and further includes a support, the arms carried by the support, the support pivotally coupled to the body to pivotally couple the arms to the body.

Example 6 includes the subject matter of any one of Examples 1 to 5, and further includes an interface carried by the body, the interface to engage a connector of a dock when the UAV is positioned in the dock.

Example 7 includes the subject matter of any one of Examples 1 to 6, and further includes landing legs.

Example 8 includes the subject matter of Example 7, where the landing legs are mounted to move from a deployed position to a stored position.

Example 9 includes the subject matter of any one of Examples 1 to 8, and further includes a camera.

Example 10 includes the subject matter of any one of Examples 2 to 9, where the rotors include first, second, third and fourth rotors.

Example 11 includes the subject matter of Example 10, where the first and second rotors are located to a first side of the body when the UAV is in the drone mode, and where the third and fourth rotors are located to a second side of the body when the UAV is in the drone mode.

Example 12 includes the subject matter of Example 11, where the first and second rotors are located adjacent a top side of the body when the UAV is in the computer mode, and the third and fourth rotors are located adjacent a bottom side of the body when the UAV is in the computer mode.

Example 13 includes the subject matter of any one of Examples 1 to 12, and further includes an actuator to move the first and second rotors between the first and second positions.

Example 14 includes a dock including a housing, the housing defining a cavity to receive an unmanned aerial vehicle (UAV), the housing including air inlet openings positioned adjacent rotors of the UAV to enable the rotors to draw air toward the UAV through the housing, and a connector for mechanical and electrical engagement with an interface of the UAV when the UAV is in the cavity.

Example 15 includes the subject matter of Example 14, where the connector includes a pogo pin interface.

Example 16 includes the subject matter of any one of Examples 14 or 15, and further includes stops disposed to reduce human access to the rotors when the UAV is in the cavity.

Example 17 includes a system including an unmanned aerial vehicle (UAV) including an unmanned aerial vehicle (UAV) including a body, rotors carried by the body, the rotors to move relative to the body from a first position when the UAV is in a drone mode to a second position when the UAV is in a computer mode, and a dock to receive the UAV when the UAV is in the computer mode.

Example 18 includes the subject matter of Example 17, and further includes a sensor to detect a presence of the UAV in the dock.

Example 19 includes the subject matter of any one of Examples 17 or 18, and further includes a connector operatively coupled to the UAV or the dock, and an interface operatively coupled to the other of the UAV or the dock, where placement of the dock on a support surface facilitates engagement of the interface to the connector via gravity.

Example 20 includes the subject matter of any one of Examples 17 to 19, and further includes a connector operatively coupled to the UAV or the dock, and an interface operatively coupled to the other of the UAV or the dock, where placement of the dock on a support surface facilitates engagement of the interface to the connector via gravity.

Example 21 includes a method including determining whether rotors of an unmanned aerial vehicle (UAV) are moved into a rotor position or a computer position, where the rotor position corresponds to a drone mode of the UAV and the computer position corresponds to a computer mode of the UAV, and upon determining that the rotors are in the computer position, spinning the rotors to cool a body of the UAV.

Example 22 includes the subject matter of Example 21, and further includes increasing a clock speed of a processor of the UAV based on determining that rotors are in the computer position.

Example 23 includes the subject matter of any one of Examples 21 or 22, and further includes decreasing a clock speed of a processor of the UAV based on determining that rotors are in the drone position.

Example 24 includes the subject matter of any one of Examples 21 to 23, and further includes determining whether the UAV is placed in a dock.

Example 25 includes the subject matter of any one of Examples 21 to 24, and further includes detecting a temperature of a component of the UAV, and varying a rotational speed of at least one of the rotors based on the detected temperature.

From the foregoing, it will be appreciated that example methods, apparatus and articles of manufacture have been disclosed that enable a UAV or drone to be used as a personal computer. For example, examples disclosed herein enable deployment of personal computer functionality to remote areas. Examples disclosed herein also enable rotors that are used in flight of the UAV to cool electronics (e.g., computing processors or heatsinks attached thereto) when the UAV is converted to personal computer use. Examples disclosed herein also enable onboard analysis and/or processing of data captured by a UAV without necessitating a need to offload the data to another personal computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle (UAV) comprising:
a body;
a heatsink carried by the body, the heatsink to cool a heat generating device of the UAV;
arms pivotable relative to the body; and
rotors carried by the arms, the arms to pivot relative to the body to move the rotors from a deployed position in which the rotors are positioned to rotate and levitate the body when the UAV is in a drone mode to a folded position in which the rotors are positioned proximate the heatsink to rotate and move air toward the heatsink when the UAV is in a computer mode.

2. The UAV as defined in claim 1, further including
at least one processor carried by the body,
the heatsink operatively coupled to the processor.

3. The UAV as defined in claim 1, further including a support, the arms carried by the support, the support pivotally coupled to the body to pivotally couple the arms to the body.

4. The UAV as defined in claim 1, further including an interface carried by the body, the interface to engage a connector of a dock when the UAV is positioned in the dock.

5. The UAV as defined in claim 1, further including landing legs.

6. The UAV as defined in claim 5, wherein the landing legs are mounted to move from a deployed position to a stored position.

7. The UAV as defined in claim 1, further including a camera.

8. The UAV as defined in claim 1, wherein the rotors include first, second, third and fourth rotors.

9. The UAV as defined in claim 8, wherein the first and second rotors are located to a first side of the body when the UAV is in the drone mode, and the third and fourth rotors are located to a second side of the body opposite of the first side when the UAV is in the drone mode.

10. A UAV as defined in claim 9, wherein the first and second rotors pivot with respective ones of first and second arms about a first axis, and the third and fourth rotors pivot with respective ones of third and fourth arms about a second axis.

11. The UAV as defined in claim 9, wherein the first and second rotors are located adjacent a top side of the body when the UAV is in the computer mode, and the third and fourth rotors are located adjacent a bottom side of the body when the UAV is in the computer mode.

12. A UAV as defined in claim 11, wherein the first and second rotors spin in a first direction, and the third and fourth rotors spin in a second direction opposite of the first direction when the UAV is in the computer mode.

13. The UAV as defined in claim 1, further including an actuator to move the rotors.

14. A system comprising:
an unmanned aerial vehicle (UAV) including:
a body;
a heatsink carried by the body, the heatsink to cool a device that generates heat within the body when the UAV is operable,
arms pivotable relative to the body, and
rotors carried by the arms, the arms pivotable relative to the body to move the rotors from a deployed position in which the rotors are positioned to rotate and levitate the body when the UAV is in a drone mode to a folded position in which the rotors are positioned proximate the heatsink to rotate and move air toward the heatsink when the UAV is in a computer mode; and
a dock to receive the UAV when the UAV is in the computer mode.

15. The system as defined in claim 14, further including a sensor to detect a presence of the UAV in the dock.

16. The system as defined in claim 14, further including a connector operatively coupled to the UAV or the dock, and an interface operatively coupled to the other of the UAV or the dock, wherein placement of the dock on a support surface facilitates engagement of the interface to the connector via gravity.

17. A system comprising:
an unmanned aerial vehicle (UAV) including:
a body;
rotors carried by the body, the rotors to move relative to the body from a first position when the UAV is in a drone mode to a second position when the UAV is in a computer mode; and
a dock to receive the UAV when the UAV is in the computer mode, the dock including an opening for a camera of the UAV when the UAV is positioned in the dock.

18. A method comprising:
determining whether arms carrying rotors of an unmanned aerial vehicle (UAV) are moved into a deployed position corresponding to a drone mode in which the rotors are positioned to levitate a body of the UAV or a folded position corresponding to a computer mode of the UAV in which the arms are pivoted to position the rotors proximate a heatsink carried by the body; and
upon determining that the arms are in the folded position, spinning the rotors to move air toward the heatsink to cool the heatsink.

19. The method as defined in claim 18, further including increasing a clock speed of a processor of the UAV based on the determining that rotors are in the computer position.

20. The method as defined in claim 18, further including decreasing a clock speed of a processor of the UAV based on the determining that the arms are in the folded position.

21. The method as defined in claim 18, further including determining whether the UAV is placed in a dock.

22. The method as defined in claim 18, further including:
  detecting a temperature of a component of the UAV; and
  varying a rotational speed of at least one of the rotors based on the detected temperature.

* * * * *